(12) United States Patent
Egan, II

(10) Patent No.: US 10,279,730 B1
(45) Date of Patent: May 7, 2019

(54) SIGNAL SYSTEM

(71) Applicant: Thomas Franklin Egan, II, Council Grove, KS (US)

(72) Inventor: Thomas Franklin Egan, II, Council Grove, KS (US)

(*) Notice: Subject to any disclaimer, the term of this patent is extended or adjusted under 35 U.S.C. 154(b) by 0 days.

(21) Appl. No.: 15/982,883

(22) Filed: May 17, 2018

(51) Int. Cl.
| | |
|---|---|
| *F21V 7/04* | (2006.01) |
| *B60Q 1/26* | (2006.01) |
| *B60Q 1/50* | (2006.01) |
| *B60Q 1/00* | (2006.01) |

(52) U.S. Cl.
CPC ......... *B60Q 1/2692* (2013.01); *B60Q 1/0088* (2013.01); *B60Q 1/50* (2013.01); *B60Y 2400/404* (2013.01); *B60Y 2400/4185* (2013.01)

(58) Field of Classification Search
CPC .. B60Q 1/0088; B60Q 1/0094; B60Q 1/2692; B60Q 1/2696; B60Q 1/50; B60Y 2400/404; B60Y 2400/4045; B60Y 2400/4185

USPC ......... 362/459, 486–487, 523, 540, 542–549
See application file for complete search history.

(56) References Cited

U.S. PATENT DOCUMENTS 9,987,976 B1 * 6/2018 Biro .......................... G09F 9/40

* cited by examiner

*Primary Examiner* — Jason M Han
(74) *Attorney, Agent, or Firm* — Plager Schack LLP; Mark H. Plager; Michael J. O'Brien

(57) ABSTRACT

A signal system for a vehicle has a vehicle mount that is configured to be attached to the vehicle. A power source is arranged through the vehicle mount and electrically coupled to a vehicle power source. A solenoid is electrically coupled to the power source and mechanically coupled to a spring. An arrow main pole is mechanically coupled to the spring, a first head blade and a second head blade. A solenoid controller is electrically coupled to the solenoid. Activating the solenoid controller engages the spring to rotate the arrow main pole approximately 180 degrees in a first direction into an expanded arrangement. Collapsing of this expanded arrangement by hand reloads the rotational energy back into the springs that can produce a future expanded arrangement.

7 Claims, 8 Drawing Sheets

SIGNAL SYSTEM

BACKGROUND

The embodiments herein relate generally to electro-mechanical systems that provide a signal.

Prior to embodiments of the disclosed invention, no system adequately deployed a signal when it was needed. Embodiments of the disclosed invention solve that problem.

SUMMARY

A signal system for a vehicle has a vehicle mount that is configured to be attached to the vehicle. A power source is arranged through the vehicle mount and electrically coupled to a vehicle power source. A solenoid is electrically coupled to the power source and mechanically coupled to a spring. An arrow main pole is mechanically coupled to the spring, a first head blade and a second head blade. A solenoid controller is electrically coupled to the solenoid. Activating the solenoid controller engages the spring to rotate the arrow main pole approximately 180 degrees in a first direction into an expanded arrangement along with rotating the first head blade in a first direction approximately forty-five degrees relative to arrow main pole and also rotating the second head blade in a first direction approximately forty-five degrees relative to arrow main pole. When this expanded arrangement is not needed, all these rotations are reversed by hand power, which manually reloads the rotational energy back into the springs, this to be fully ready and able to later produce a future expanded arrangement.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
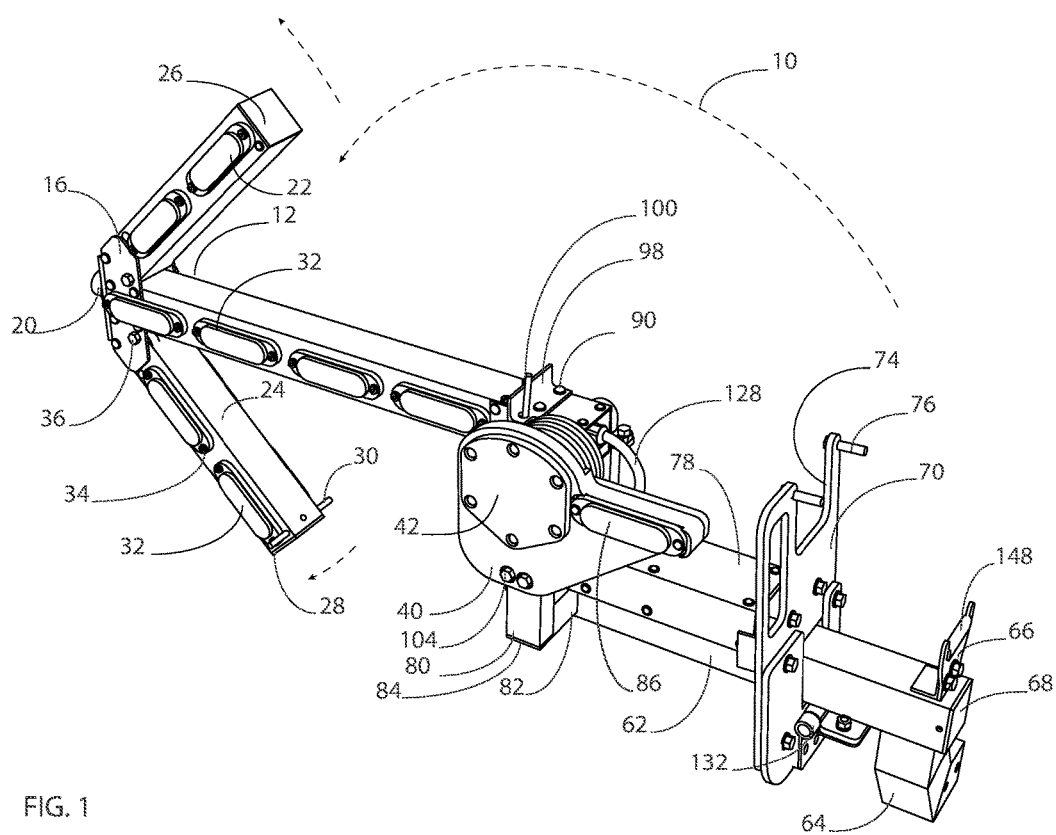
FIG. 1 shows a first side perspective view of one embodiment of the present invention in an expanded arrangement.
Figure 2:
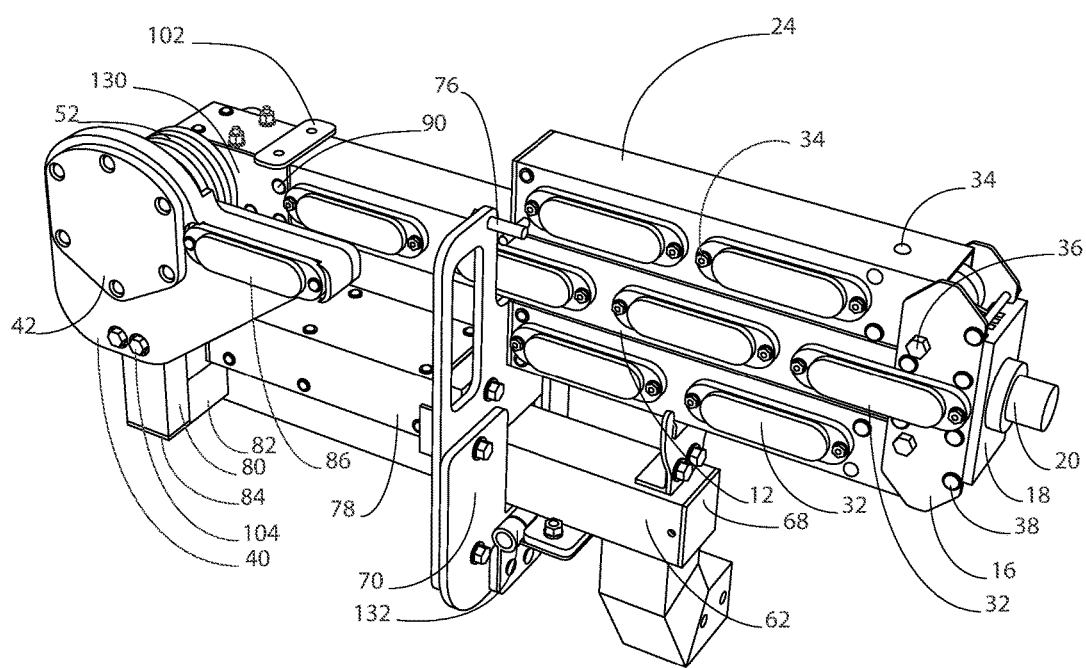
FIG. 2 shows a first side perspective view of one embodiment of the present invention in a collapsed arrangement.
Figure 3:
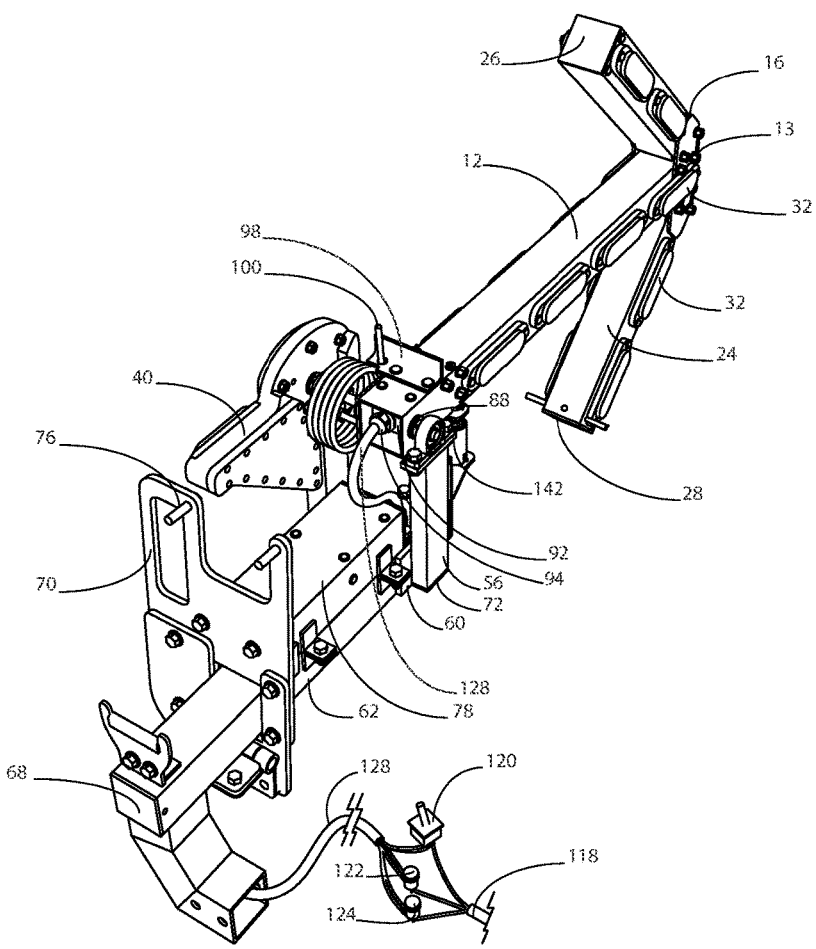
FIG. 3 shows a second side perspective view of one embodiment of the present invention in an expanded arrangement.
Figure 4:
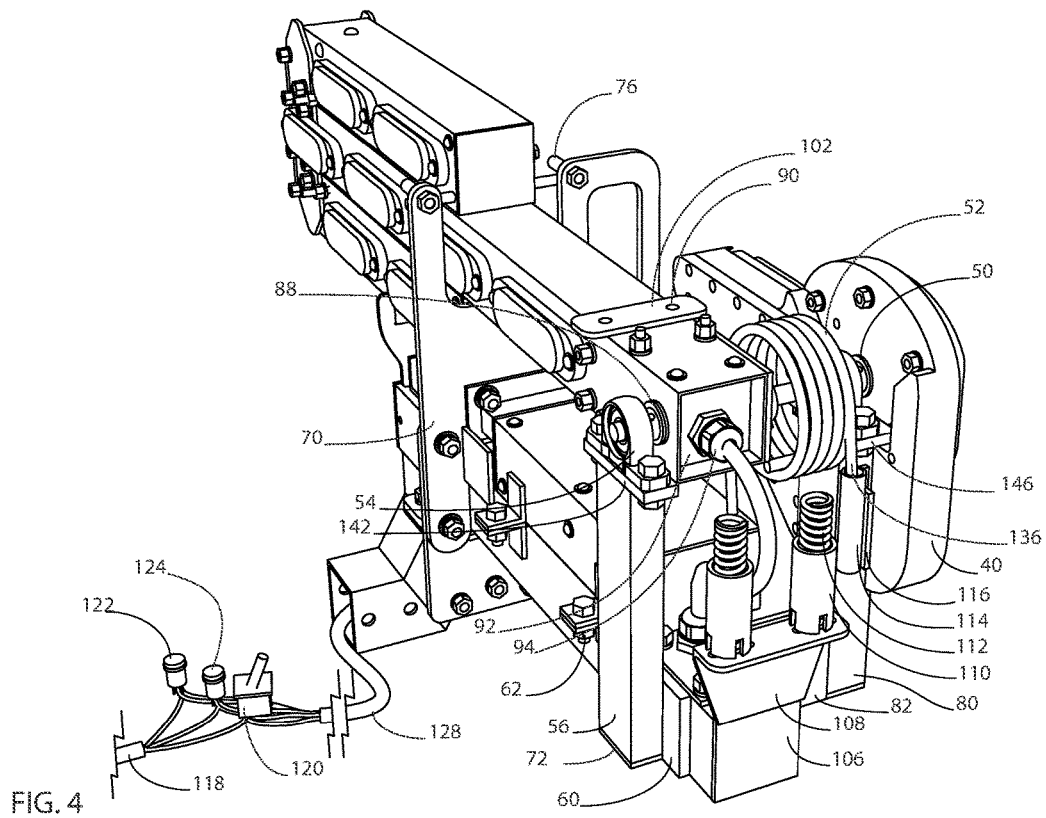
FIG. 4 shows a second side perspective view of one embodiment of the present invention in a collapsed arrangement.
Figure 5:
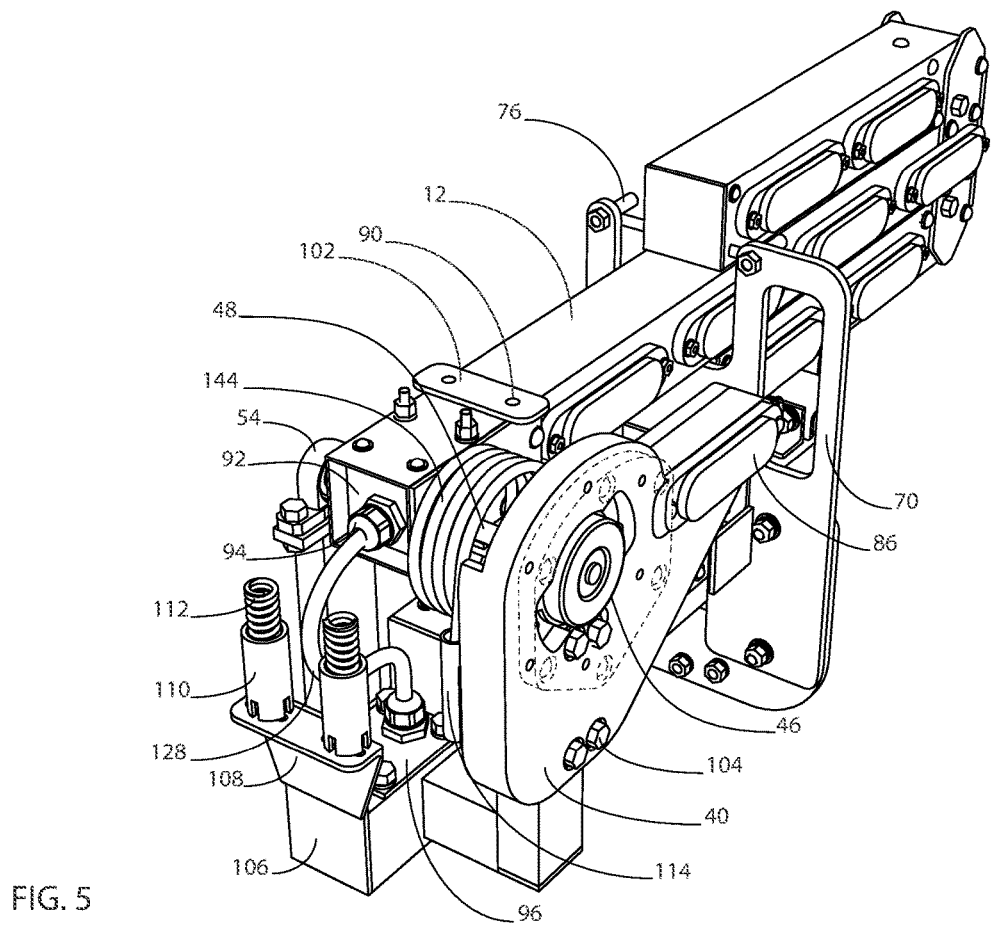
FIG. 5 shows a first side perspective view of one embodiment of the present invention with some components removed for clarity.
Figure 6:
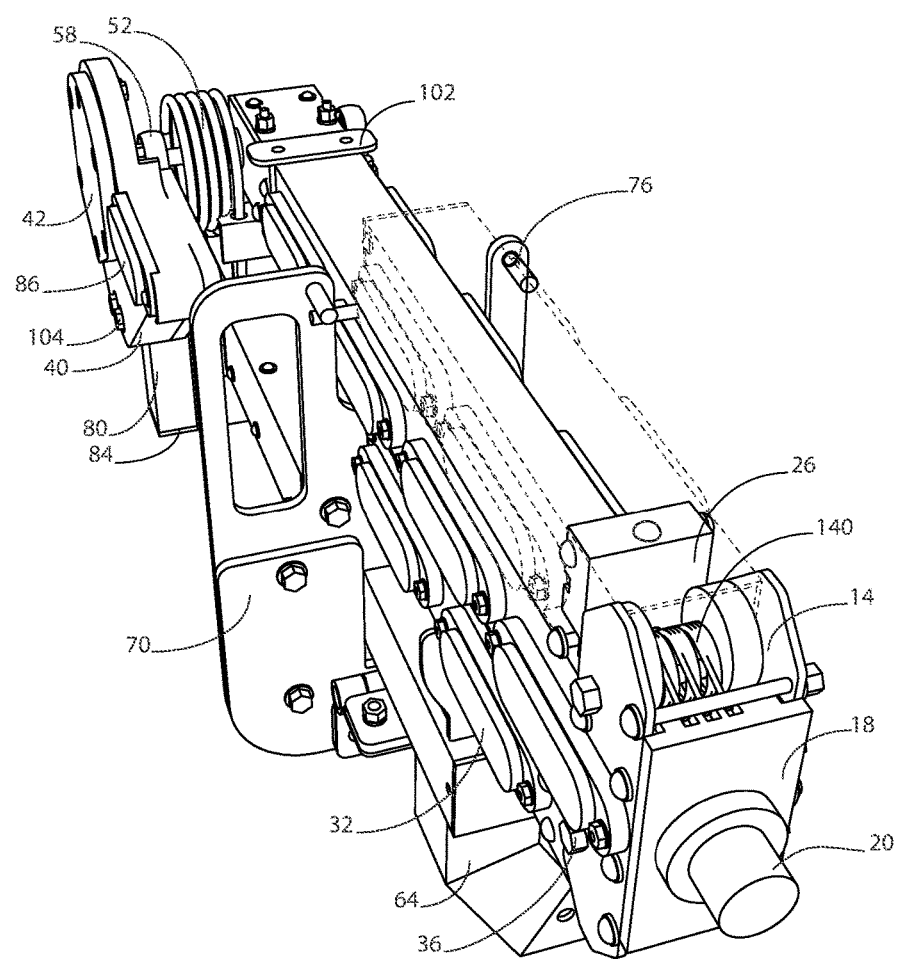
FIG. 6 shows a rear perspective view of one embodiment of the present invention with some components removed for clarity.
Figure 7:
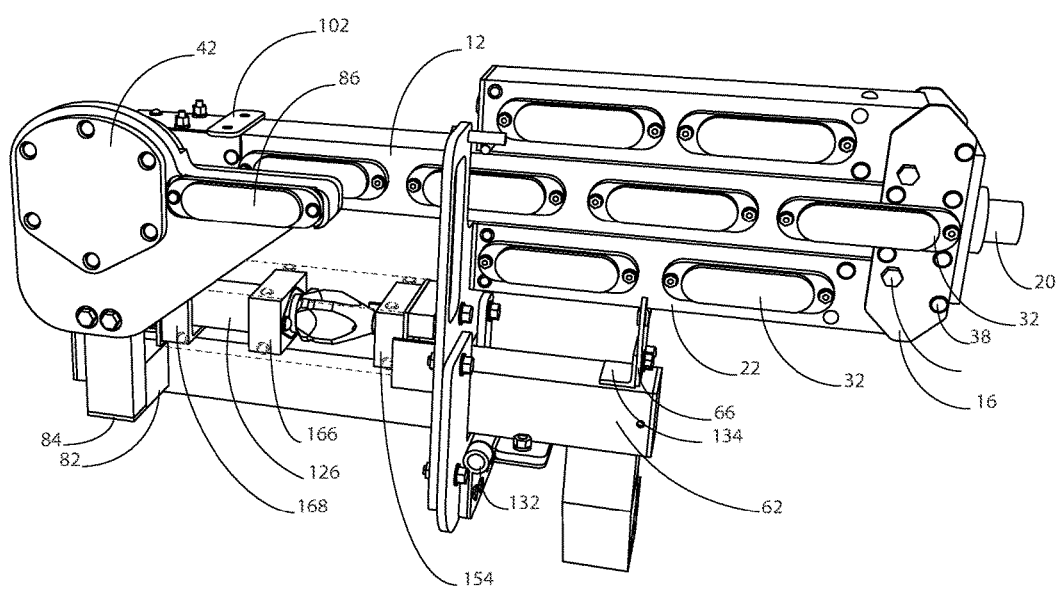
FIG. 7 shows a side perspective view of one embodiment of the present invention with some components removed for clarity.
Figure 8:
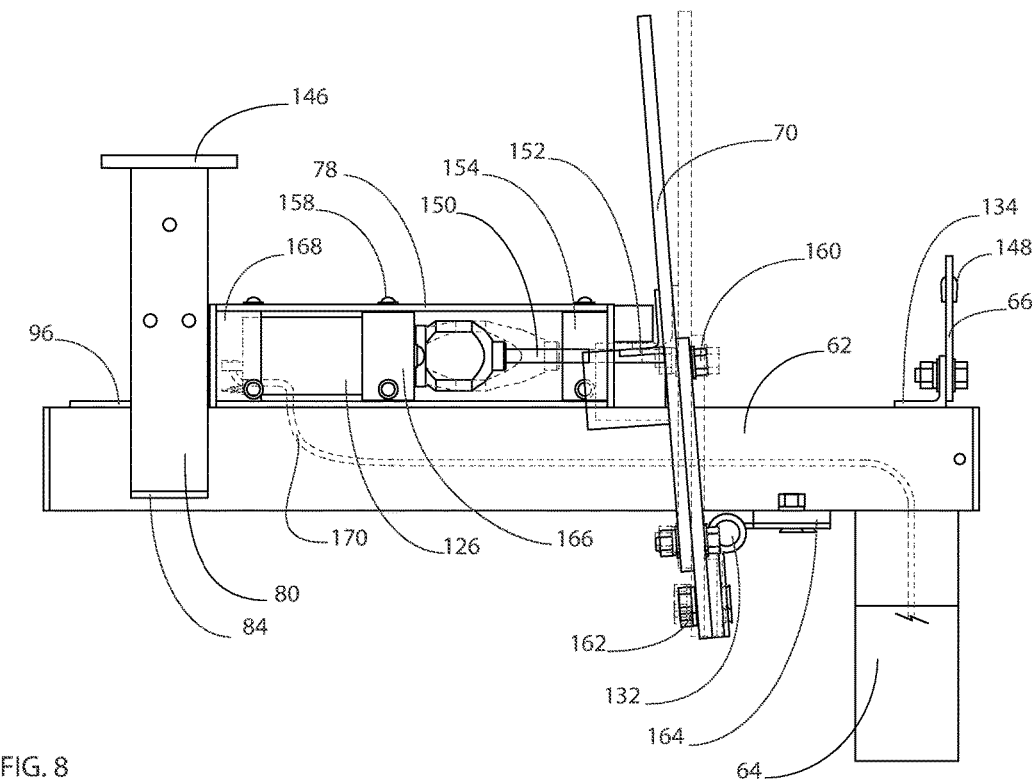
FIG. 8 shows a side close-up view of a few of the components of one embodiment of the present invention with some components removed for clarity.

By way of example, and referring to FIG. 1, one embodiment of a signal system 10 comprises an arrow main pole 12 mechanically coupled to a first end bracket 14 and a second end bracket 16. The first end bracket 14 and the second end bracket 16 are attached to a first end bracket 18. The first end bracket 18 is attached to a first end bracket light 20.

The first end bracket 14 and the second end bracket 16 are rotationally attached to a first head blade 22 and a second head blade 24 with blade springs. The first head blade 22 is attached to a first head blade plug 26. The second head blade 24 is attached to a second head blade plug 28. The second head blade 24 is further attached to a locking rod 30 proximate the second head blade plug 28. The first head blade 22, the second head blade 24, and the arrow main pole 12 are each attached to a plurality of lights 32 with a plurality of fasteners 34. The first end bracket 14 and the second end bracket 16 can be joined with a plurality of shoulder bolts 36 and a plurality of machine screws 38 as necessary.

A damper mount 40 is attached to a second side vertical column 80, arranged between a damper housing front cover 42 and a damper housing rear cover 44. A disc dampener 46 is attached to the damper mount 40 and is mechanically attached to shaft 48. Shaft 48 is attached to arrow main pole 12. The non-rotating leg 136 of main torsion spring 52 is attached to hollow vehicle mount 64. The rotating leg 100 of main torsion spring 52 is attached to arrow main pole 12. Shaft 48 is mechanically attached to a first side pillow block bearing 54 and is also mechanically attached to a second side pillow block bearing 58. First side pillow block bearing 54 is attached to first side vertical column 56 with a first side bearing mount plate 142. A second side pillow block bearing 58 is attached to the second side vertical column 80 with a second side bearing mount plate 146. In some embodiments, there can be a washer 88 there between the first side pillow block bearing 54 and the arrow main pole 12. In some embodiments, there can be a washer 50 there between the second side pillow block bearing 58 and the damper mount 40.

The first side vertical column 56 is further attached to a first side bottom closure 72 and a first side spacer 60. The spacer is further attached to a base member 62. The base member 62 is attached to a hollow vehicle mount 64 and having an end cap 68 at a proximal end. The base member 62 is attached to the arrow rest 66 with a rest angle base 134. The base member 62 is further attached to a spring-loaded hinge 132. Spring-loaded hinge 132 is attached to locking paddle 70. Strike plate 152 is attached to locking paddle 70. The locking paddle 70 further comprises a channel portion 74 attached to a pair of shoulder bolts 76. Distal the channel portion 74, the hollow vehicle mount 64 is attached to a solenoid housing 78.

The damper mount 40 is attached to a dampener light 86. The damper mount 40 is attached to the second side vertical column 80 with a plurality of fasteners 104. The second side vertical column 80 is further attached to the base member 62 with a second spacer 82. The second side vertical column 80 is capped with a second side bottom closure 84.

The arrow main pole 12 further comprises a cable end plug 92 with a strain relief 94. The arrow main pole 12 has a side attached to an angle mount for main spring 98 and the rotating leg 100 of main torsion spring 52. The arrow main pole 12 has a side attached to an impact plate 102 with a plurality of countersunk machine screws 90.

The base member 62 is attached to a second end bracket 106 and a support bracket 108. The support bracket 108 is attached to a plurality of spring housings 110. Each spring housing 110 has a cushioning spring 112 inserted therein. The second side vertical column 80 is attached to a spring leg scabbard 114 with an angle bracket 116.

A power source 118 is electrically coupled to a power switch 120, a flash controller 122 and a solenoid controller 124. The flash controller 122 is electrically coupled to all of the lights. The solenoid controller 124 is electrically coupled to a solenoid 126 that is mounted inside a solenoid housing 78 that is attached to the base member 62. When energized, the solenoid 126 retracts the solenoid plunger or latch bolt 150 from engagement with the strike plate 152. The strike plate 152 is attached to a locking paddle 70, a spring-loaded hinge 132 and a plurality of shoulder bolts 76. The retraction of the solenoid plunger or latch bolt 150 engages the spring-loaded hinge 132, rotating the plurality of shoulder bolts 76 out of engagement with locking rod 30, resulting in an expanded arrangement. The rotating of the plurality of shoulder bolts 76 out of engagement with the locking rod 30 engages the main torsion spring 52 to rotate the arrow main pole 12 approximately 180 degrees in a first direction into an expanded arrangement.

In some embodiments, the rotating of the plurality of shoulder bolts 76 out of engagement with locking rod 30 also engages a second torsion spring 140 that is mechanically coupled to the first end bracket 14 and the second end bracket 16 and the first head blade 22. This rotates the first head blade 22 in a first direction approximately forty-five degrees relative to the arrow main pole 12. In some embodiments, the rotating of the plurality of shoulder bolts 76 out of engagement with locking rod 30 also engages a second torsion spring 140 that is mechanically coupled to first end bracket 14 and second end bracket 16 and second head blade 24, rotating this second head blade 24 in a first direction approximately forty-five degrees relative to arrow main pole 12.

The arrow main pole 12 is mechanically attached to a shaft 48, the shaft 48 is also mechanically attached to the disc dampener 46. The function of the disc dampener 46 is to slow the rate of expansion of the arrangement.

Power from a power switch 120 flows from a flash controller 122 into an electrical cable 128, which passes through the hollow vehicle mount 64 and into a base member 62. Inside the base member 62 the electrical cable 128 branches into two electrical cables 128. The first such electrical cable 128 goes through the second spacer 82, the second side vertical column 80 and damper mount 40, to illuminate the dampener light 86. The second such electrical cable 128 goes out through cable cover plate 96 and strain relief 94, then through another strain relief 94 and cable end plug 92, then through arrow main pole 12, providing electrical power to a plurality of lights 32 and also the first end bracket light 20. The plurality of lights 32 and also the first end bracket light 20 can be strobe lights.

Inside arrow main pole 12 this electrical cable 128 also branches into two more runs of electrical cable 128, one into first head blade 22 and the other into second head blade 24, providing electrical power to a plurality of lights 32 on each.

Electrical cable 170 runs from power switch 120 to solenoid controller 124, and then through electrical wire 138 through hollow vehicle mount 64, base member 62 and into solenoid housing 78 to power the solenoid 126.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A signal system for a vehicle, the signal system comprising:
   a vehicle mount, configured to be attached to the vehicle;
   a power source, arranged through the vehicle mount and electrically coupled to a vehicle power source;
   a solenoid, electrically coupled to the power source and mechanically coupled to a spring;
   an arrow main pole, mechanically coupled to the spring;
   a first head blade and a second head blade, mechanically coupled to blade springs; wherein collapsing the arrow main pole into a collapsed arrangement reloads a rotational energy back into the blade springs that can produce a future expanded arrangement;
   a solenoid controller, electrically coupled to the solenoid;
   wherein activating the solenoid controller engages the spring to rotate the arrow main pole approximately 180 degrees in a first direction into an expanded arrangement;
   wherein activating the solenoid controller engages the blade springs to rotate the first head blade in a first head blade first direction approximately forty-five degrees relative to the arrow main pole and rotate the second head blade in a second head blade first direction approximately forty-five degrees relative to the arrow main pole into the expanded arrangement;
   wherein collapsing can be done by hand.

2. The signal system of claim 1, further comprising:
   a first end bracket, attached to the arrow main pole with a first end bracket, a second end bracket, and a first end bracket light;
   a flash controller, electrically coupled to the power source and the first end bracket light;

wherein engaging the flash controller causes the first end bracket light to flash; and wherein disengaging the flash controller causes the first end bracket light to stop flashing.

3. The signal system of claim 2, further comprising:
a plurality of lights, attached to the arrow main pole and electrically coupled to the flash controller;
wherein engaging the flash controller causes the plurality of lights to flash;
wherein disengaging the flash controller causes the plurality of lights to stop flashing.

4. The signal system of claim 3, further comprising the first head blade, joined to the first end bracket and a second end bracket with a first torsion spring;
wherein when the arrow main pole is in the expanded arrangement, the first head blade is in a deployed configuration;
wherein when the arrow main pole is in the collapsed arrangement, the first head blade is in a collapsed configuration.

5. The signal system of claim 4, further comprising the second head blade, joined to the first end bracket and the second end bracket with a second torsion spring;
wherein when the arrow main pole is in the expanded arrangement, the second head blade is in the deployed configuration;
wherein when the arrow main pole is in the collapsed arrangement, the second head blade is in the collapsed configuration.

6. The signal system of claim 5, further comprising a base member, operatively coupled to the spring and the vehicle mount.

7. The signal system of claim 6, further comprising a locking paddle, rotatably coupled to the vehicle mount; wherein when the arrow main pole is in the collapsed arrangement, the second head blade, the arrow main pole and the first head blade are all held against an arrow rest by the locking paddle, preventing them from rotating into the expanded arrangement.

* * * * *